United States Patent
Griffin et al.

(10) Patent No.: US 10,148,548 B1
(45) Date of Patent: Dec. 4, 2018

(54) SYSTEM AND METHOD FOR REAL-TIME ANALYSIS OF INCOMING DATA

(71) Applicant: Appcelerator, Inc., Mountain View, CA (US)

(72) Inventors: Mark Griffin, Fairfax, CA (US); David Rosenberg, San Francisco, CA (US); Vasil V Daskalopoulos, Edison, NJ (US)

(73) Assignee: Axway, Inc., Phoenix, AZ (US)

( * ) Notice: Subject to any disclaimer, the term of this patent is extended or adjusted under 35 U.S.C. 154(b) by 446 days.

(21) Appl. No.: 14/167,835

(22) Filed: Jan. 29, 2014

Related U.S. Application Data

(60) Provisional application No. 61/757,953, filed on Jan. 29, 2013.

(51) Int. Cl.
*H04L 12/26* (2006.01)

(52) U.S. Cl.
CPC .................... *H04L 43/50* (2013.01)

(58) Field of Classification Search
CPC ....................................... H04L 43/50
USPC ................................. 709/223, 224
See application file for complete search history.

(56) References Cited

U.S. PATENT DOCUMENTS

| | | | | |
|---|---|---|---|---|
| 7,376,969 B1* | 5/2008 | Njemanze | ............... | G06F 21/55 709/224 |
| 7,889,666 B1* | 2/2011 | Pei | ........................ | H04L 41/065 370/242 |
| 2006/0221930 A1* | 10/2006 | Sweeney | ................. | H04L 45/00 370/351 |
| 2009/0012760 A1* | 1/2009 | Schunemann | ......... | G06Q 10/06 703/6 |
| 2014/0067734 A1* | 3/2014 | Hawkins | .................. | G06N 5/02 706/12 |
| 2014/0173102 A1* | 6/2014 | Kay | ...................... | H04L 41/142 709/224 |
| 2017/0075726 A1* | 3/2017 | Park | ........................ | G06F 9/505 |

* cited by examiner

*Primary Examiner* — Viet D Vu
(74) *Attorney, Agent, or Firm* — Staniford Tomita LLP

(57) ABSTRACT

The inventive system processes large quantities of client data. The inventive system can include an inbound message gateway (IMG) which receives event data from a plurality of clients. The IMG performs one or more processes on the event data and transmits sample data streams to an analytics cluster that includes a plurality of physical hardware nodes. Each of the physical hardware nodes can include a plurality of processes at a plurality of different time granularities. Database shards store recorded data from each of the processes in the physical nodes.

5 Claims, 8 Drawing Sheets

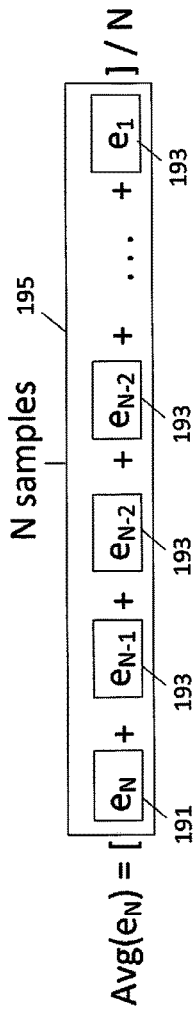
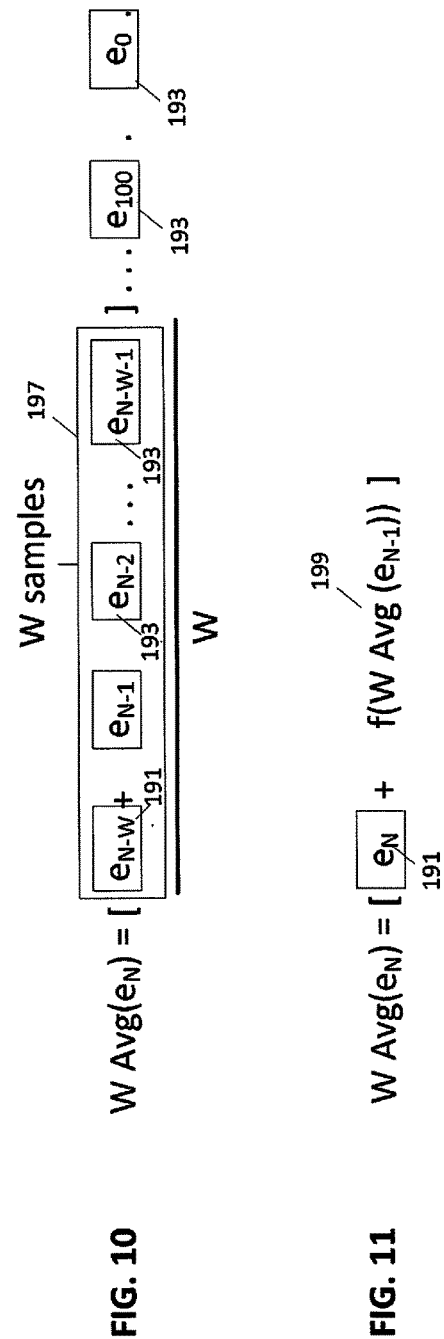
$Avg(e_N) = [\; e_N + e_{N-1} + e_{N-2} + \ldots + e_{N-2} + e_1 \;]/N$
FIG. 8
$Avg(e_N) = [\; e_N \;] + f(Avg(e_{N-1}))\;]$
FIG. 9
$W\,Avg(e_N) = [\; e_{N-w} + e_{N-1} + e_{N-2} + \ldots + e_{N-w-1} \;]\ldots e_{100} \ldots e_0$
$W$
FIG. 10
$W\,Avg(e_N) = [\; e_N \;] + f(W\,Avg(e_{N-1}))\;]$
FIG. 11

SYSTEM AND METHOD FOR REAL-TIME ANALYSIS OF INCOMING DATA

CROSS REFERENCE TO RELATED APPLICATIONS

This application claims priority to U.S. Provisional Patent Application No. 61/757,953, "Method And System For Nodeable Stream Analytics" filed Jan. 29, 3013, the contents of which are hereby incorporated by reference in its entirety.

FIELD OF THE INVENTION

The present invention is directed towards a system that performs the real-time analysis of incoming streams of raw data and generates insight messages describing important aspects of the data streams.

BACKGROUND

Analysis techniques for large data sets have been loosely categorized into batched and real-time systems and methods. Both batched and real-time systems collect data as the data appears with varying amounts of latency. However, batched and real-time systems subsequently query the data is different ways. There are advantages and disadvantages to both systems that can be appropriately applied to various types of problems. For example, an advantage of real-time systems is that the results of a query are updated immediately and are available even as new data is flowing into the system. However real-time systems may need to determine the exact set of statistics that are being updated beforehand. A batched system has the advantage of allowing any ad-hoc query to be made, but the results of that query will be returned according to the computational resources available to the system. Simpler queries will take less time to return results than more complex queries. However, a complex query can take an indeterminate amount of time to return results. Another problem is that the batched system query is being run on a view of the data at a particular time, without being updated by new data coming into the batched system unless the query is re-run.

What is needed is an improved hybrid system and method that includes features of both batched and real-time systems and methods.

SUMMARY OF THE INVENTION

The present invention is directed towards a system for processing large quantities of client data. The inventive system can include an inbound message gateway (IMG) which receives event data from a plurality of clients. The IMG can perform various processes on the event data such as receiving raw data, extracting numerical data samples, adding time stamps and normalizing non-numerical streams into numerical sub-streams. The IMG can transmit sample data streams to an analytics cluster that includes a plurality of physical hardware nodes. Each of the physical hardware nodes can include a plurality of processes at a plurality of different time granularities. Each of the physical nodes can also have a corresponding database shard which stores data from each of the processes in the node.

The data streams from the IMG can be processed with a series of processes with increasing time granularities. For example, the stream data can be first be processed by a seconds-process. The output of the seconds process can be the input for the minutes-process and the output of the minutes-process. The output of the minutes-process can be the input for the hours-process, etc. The number of processes for each granularity can be inversely proportional to the duration of the granularity. So the analytics cluster can have many seconds-processes and much fewer days-processes. The process data for each process can be stored in the data shard in the physical node. In an embodiment, the processes can be automatically evenly distributed over each of the physical nodes to balance the processing loads across each of the physical nodes.

DESCRIPTION OF DRAWINGS

FIGS. 8-11 illustrate graphical representations of mathematic equations.

DETAILED DESCRIPTION

Figure 1:
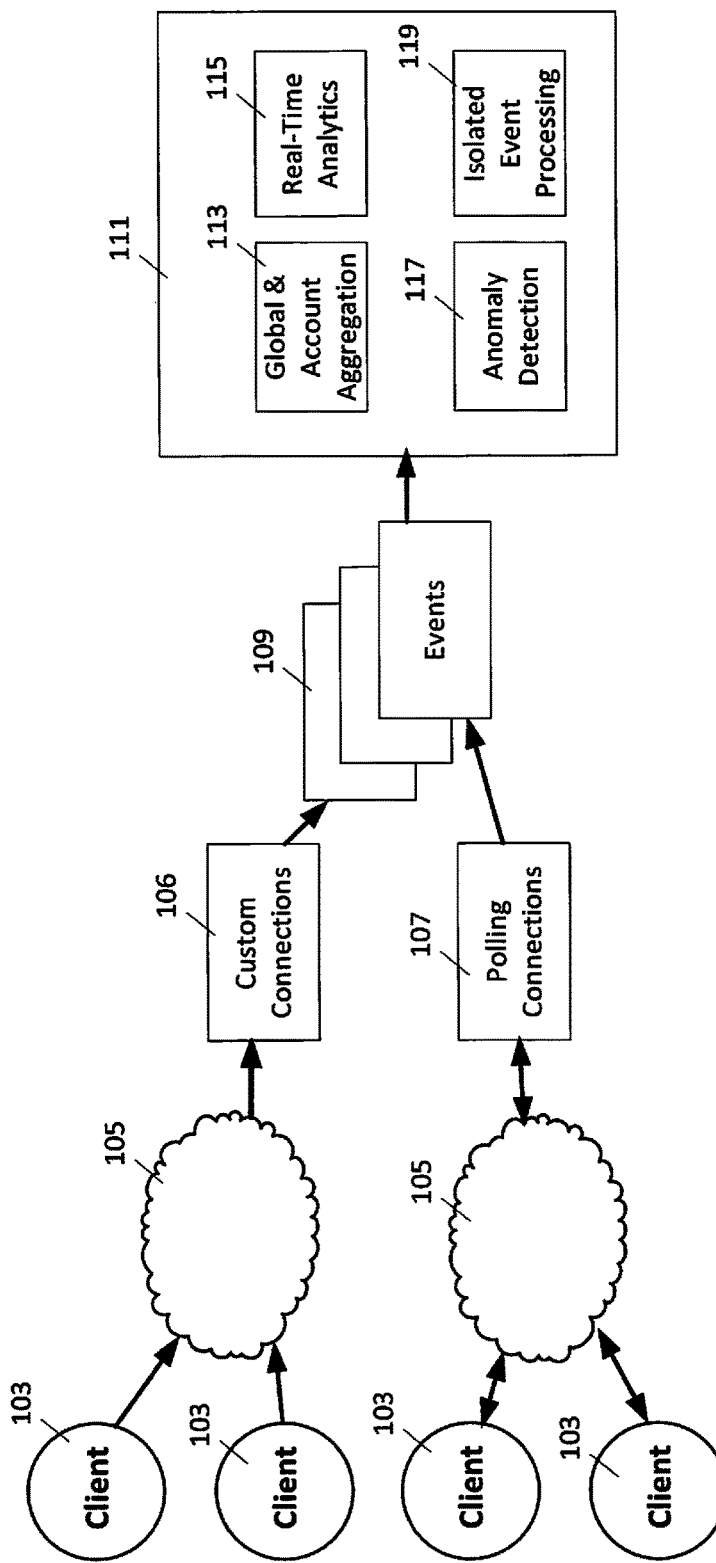
FIG. 1 illustrates a block diagram of embodiment of the inventive system.

The inventive system implements a design to make the most common queries available by real-time updates that leaves a small minority of ad-hoc queries that need to be made by existing batched methods. An example of a batched method is MapReduce. With reference to FIG. 1, an example of an embodiment of the inventive data processing system 100 is illustrated. The system 100 can include custom connections 106 and/or polling connections 107 which receive data from clients 103 through one or more networks 105. The event data 109 are transmitted to data processing system 111 which can process the event data 109. In different embodiments, the inventive system 100 can perform various functions performed by different modules including: global and/or account aggregation of event data 113, real-time analytics 115, anomaly detection 117 and isolated event processing 119.

In an embodiment, the inventive system 100 performs real-time analysis on incoming events in order to support the generation of insight messages that can: record "features" of the raw events such as counts, averages, diffs, max/min and/or report on statistical anomalies divergent from the trends in those features. The inventive system 100 can also generate output analytics that serve as vital inputs to subsequent algorithms run in a separate system that can: correlate anomalies across event sources, determine causality of correlated events and/or do predictive analysis for various features of the data In a general sense, an input data stream can be any time series sequence of numerical values that arrive somewhat regularly. The time series sequence of numerical values can be plotted as a function with an x-axis of time, and a y-axis of the numerical value itself. For each of the sample values sent in these events (the values of the y-axis), various features can be calculated on the fly and stored in real-time. For example, in an embodiment the features that can be calculated on the fly and stored in real-time can include the features listed in Table 1 below.

TABLE 1

| Feature | Variable |
| --- | --- |
| 1 The raw value of the sample | y(t) |
| 2 The first derivative of y(t) with respect to time | dy/dt |
| 3 The incremental, decayed, windowed average of y(t) | agv(y(t)) |
| 4 The incremental, decayed, windowed standard deviation of y(t) | stddev(y(t)) |
| 5 The average value of dy/dt | agv(dy/dt) |
| 6 The minimum value of dy/dt | min(dy/dt) |
| 7 The maximum value of dy/dt | max(dy/dt) |
| 8 The difference from the previous time sample | diff(y(t)) |

Figure 2:
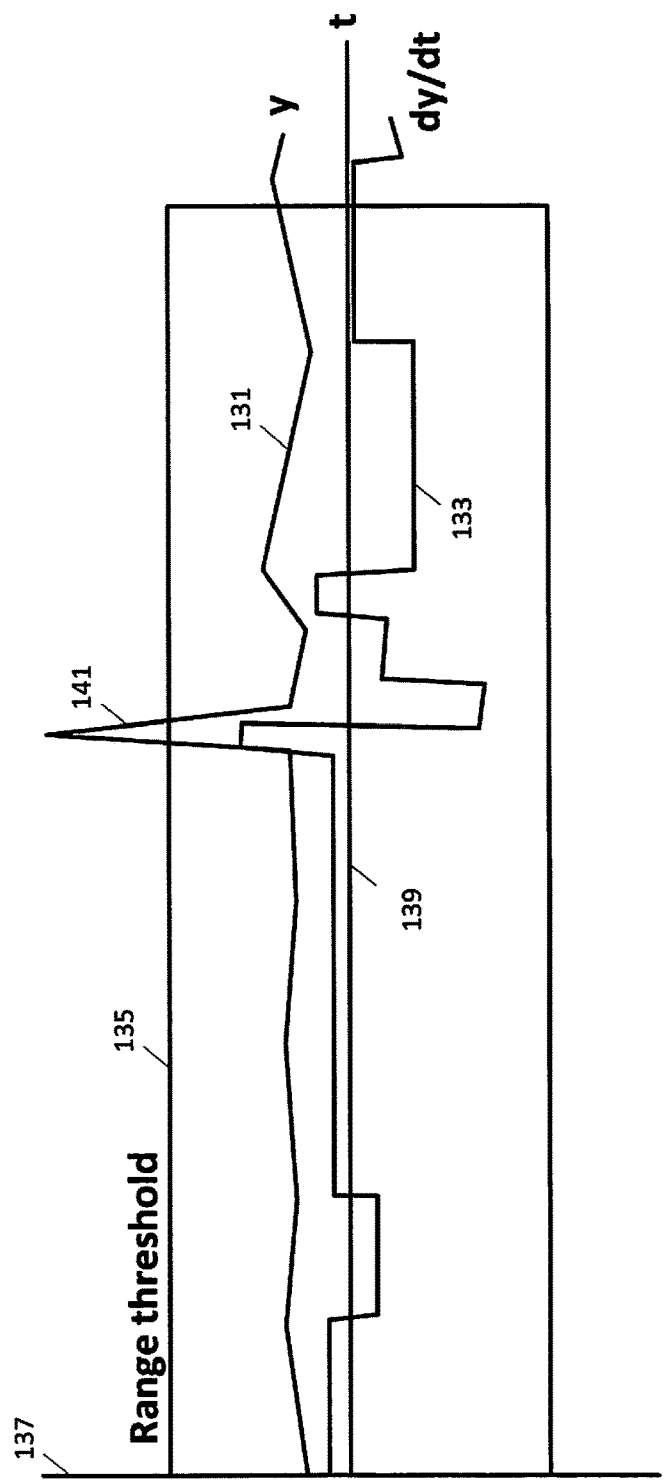
FIG. 2 illustrates a graph of an input data stream showing y(t) and the first derivative dy/dt.

With reference to FIG. 2 a graphical representation of y(t) 131 and the first derivative dy/dt 133 is illustrated with the y and dy/dt values recorded in the vertical axis 137 against time in the horizontal axis 139. In different embodiments, each of the features can be stored and persisted along with the raw sample as the new data is received in real time by the inventive system. Also, in the event of a failure, the system can recover by recalculating individual features from a stream of raw samples alone if necessary. For example, in an embodiment each of these features can be incrementally derived on the fly by looking at only the past few samples. Thus, the inventive system may not need to scan all the data again or utilize an offline batch process to generate the necessary results.

In an embodiment, the value of y can have a range threshold represented by the box 135. When the value of y at 141 exceeds the threshold value 135, the system can inform the user that the y 131 value has exceeded the maximum value of the range threshold 135 while y is greater than the maximum range threshold. The crossing of the threshold can also be recorded and this occurrence can be used by algorithms to perform analytic functions described above.

Figure 3:
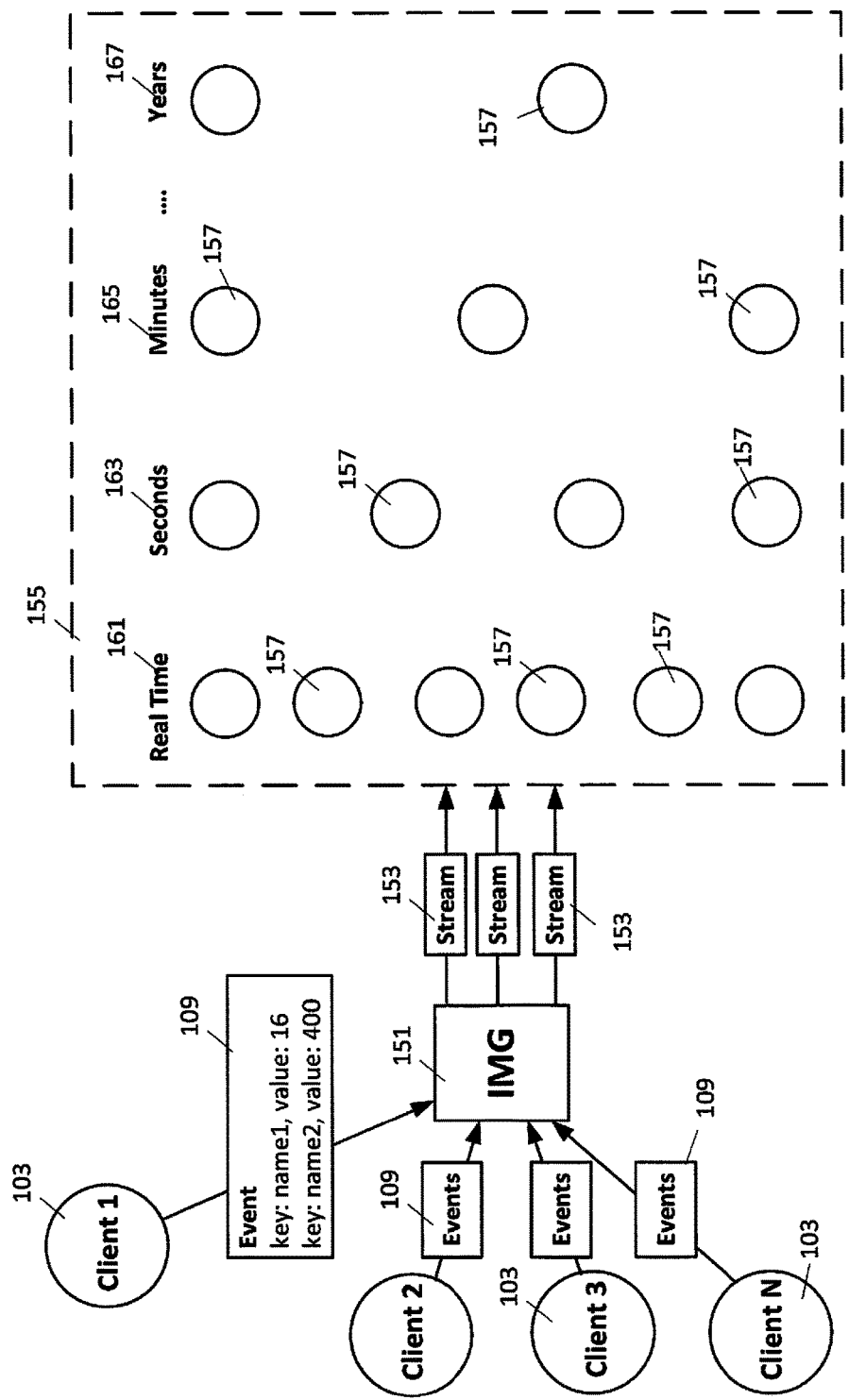
FIG. 3 illustrates a block diagram of an embodiment of data flow through the inventive system.

FIG. 3 illustrates an embodiment of the overall system data flow of the inventive system. A plurality of clients 103 can transmit event data 109 to the Inbound Message Gateway (IMG) 151. The multiple clients 103 of the inventive system can asynchronously post event data to the Inbound Message Gateway (IMG) component 151. The IMG 151 can perform any individual or combinations of functions. Examples of possible functions that can be performed by the IMG 151 are listed in Table 2. The IMG 151 can then transmit data streams 153 to the analytics cluster 155.

TABLE 2

| | Function |
| --- | --- |
| 1 | receive raw event data from a network transport |
| 2 | extract one or more numerical data samples from the raw event data |
| 3 | automatically time stamp to the current time on samples that do not have a timestamp provided by the client |
| 4 | normalize any non-numerical streams into numerical streams by the normalization function |

The analytics cluster 155 can include a distributed system of physical process nodes 157 that are shown logically organized by increasing time granularity towards the right, but in an actual installation the processes might not be ordered logically across the layout of physical nodes 157 in the analytics cluster 155. The data processing can be distributed across several physical nodes 157 in the cluster so that no single data stream's 153 processes are crowding a single physical node 157. The physical hardware nodes 157 can each have a number of processes running to parallelize the computation of analytics for all the data streams 153 being handled. For each data stream 153, multiple time granularities 161, 163, 165, 167 are being analyzed. Rather than synchronizing the entire system to a master clock that would generate samples for all the data streams 153 at fixed intervals, the inventive system generates the samples asynchronously in each processes by allowing the arrival of samples from the lower granularity processes feeding into it to dictate when the processing occurs. This has the net effect of minimizing the "thundering herds" problems in a distributed system which can occur when a large number of processes waiting for an event are awoken when that event occurs, but only one process is able to proceed at a time. After the processes wake up, they all demand the resource and a decision must be made as to which process can continue. After the decision is made, the remaining processes are put back to sleep, only to all wake up again to request access to the resource. This problem can occur repeatedly, until there are no more processes to be woken up. Because all the processes use system resources upon waking, it is more efficient if only one process was woken up at a time. The macroscopic behavior of the entire system is a more evenly distributed demand for CPU resources.

In an embodiment the inventive system can accept the raw numerical values in any format, with or without a timestamp for each value. The IMG 151 can receive raw event data from a network transport such as HTTP. The IMG 151 may not require a specific network transport type. Thus, the IMG 151 is more flexible than systems that can only receive and process raw event data is a specific transport type.

In an embodiment, the IMG 151 can extract one or more numerical data samples from the raw event data 109. For example, the event data 109 might contain a data sample for multiple data streams 153. The multiple stream data can be automatically detected by the IMG 151. These multiple stream data samples can be named or inferred positionally in the data format of the event by the IMG 151. Then IMG can then direct the data samples to the appropriate data stream 153. In the following example, the raw event data 109 samples for various data streams 153 are named explicitly: {"ts": "12:46 PM 1/22/2014", "sensor1": {"temperature": 46, "humidity": 85}, "sensor2": {"temperature": 44, "humidity": 83}}. For the time stamp 12:46 PM 1/22/2014, the names of the four streams 153 samples extracted could be:

stream: Client1.sensor1.temperature, value: 46
    stream: Client1.sensor1.humidity, value: 85
    stream: Client1.sensor2.temperature, value: 44
    stream: Client1.sensor2.humidity, value: 83

In an embodiment, the data can be inferred positionally with the names not explicitly named. For example, the position format can be: sensor 1 temperature, sensor 1 humidity, sensor 2 temperature, sensor 2 humidity. So the names of the data can be inferred by the positions of the data without the need to explicitly name the data. In this example, the transmitted data is for temperature and humidity. In other embodiments, the inventive system can be used with data that can describe or be related to anything.

The system can accept the data in any format, with or without a timestamp for each value. If the values are not time stamped, the system defaults the timestamp for each value to the time it arrived at the system input. However, an advantage to having values with explicit timestamps already set is that the data can then be sent to the system in batches by the clients of the system.

Sample data that does not have a timestamp provided by the clients 103 can be automatically time stamped with the current time by the IMG 151. For example, if the data sample values are not time stamped, the system defaults the timestamp for each value to the time the data samples arrived at the system input. The advantage to having values with explicit timestamps already set is that the events having the same timestamp can then be sent to the system in batches by the clients of the system. Possible event data 109 transmitted from the client to the IMG can include "key: name1, value: 16" and "key: name2, value: 400" as illustrated in FIG. 3. If these two event data have the same time stamp, the IMG 151 can transmit multiple samples of event data 109 to the analytics cluster 155 processes in a single batch rather than separate transmissions.

This process can be described in different examples. In a first case example of raw events sent with timestamps, a thermostat can send the temperature data every 5 minutes and the thermostat can send the raw temperature event as soon as the temperature readings are taken. The thermostat can send raw event data with a timestamp field and a temperature value field. The timestamp can be the time that the reading was made and sent. Because the temperature data is instantaneously sent, the thermostat can actually just leave out the timestamp and the IMG would use the arrival time as the timestamp of the event.

In a second case example, the thermostat can take a reading every 5 minutes, but in order to save network costs the readings can be stored in a file locally. The data can be sent in batches at any time interval such as once per day. The inventive system can still process these batched events. However, because data is not received in real-time, the real-timeliness output of the system can be delayed. Data from each of the individual events needs to be time stamped so the algorithms used with the inventive system can properly process the data. For example, the time stamp may be necessary for the system's anomaly detection on the hourly granularity to be fully functional.

Each numeric sample for each stream can be sent from the IMG 151 to the analytics cluster 155. The analytics cluster 155 can contain multiple physical computation nodes 157 each of which can have one or more processes for performing the analytics functions. The analytics clusters 157 can contain multiple physical computation threads which can also preform the analytics functions. The use of process or threads can depend upon the nature of the system implementation.

Within the analytics cluster 155 there can be multiple processes dedicated to each of the time granularities that the inventive system is configured to process. The time granularities can usually map to familiar units of time such as: real time 161, second 163, minutes 165, hours 167, days 169, week, month, year, etc. However, in other embodiments, the granularities can be any predetermined periods of time.

The processing for each single data stream 153 can be distributed across multiple processes in the physical computational nodes 157 of the analytics cluster 155. For example, different time granularities for a single data stream 153 might be processed by different processes. The processes can most likely be running on different physical nodes 157 in order to more efficiently parallelize the required system computations. A single physical node 157 in the analytics cluster 155 can host processes for a mixture of time granularities and data streams 153.

Figure 4:
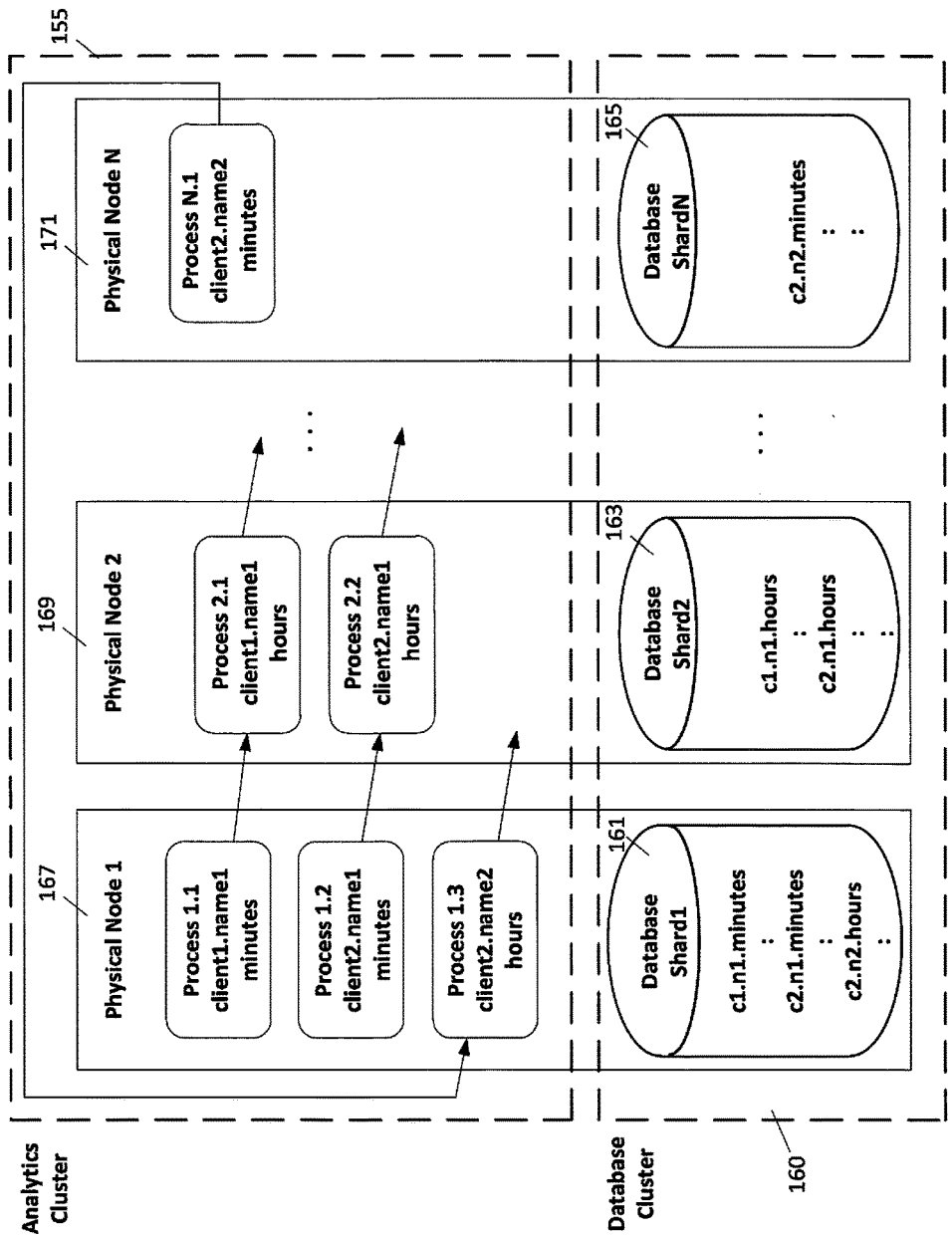
FIG. 4 illustrates a block diagram of an embodiment of the physical allocation of analytic cluster process nodes and database cluster shards.

In an embodiment with reference to FIG. 4, an example allocation of processes in the analytics cluster 155 is illustrated. The analytics cluster 155 might have many physical nodes 167, 169, 171 which process many client data streams at different granularities. The database cluster 157 can similarly have multiple data stream's data on a single shard 161. Different granularities for a single data stream will be spread across several shards 161. The inventive system provides several different features. Each data stream can be processed by the analytics cluster 155 at several time granularities such as: seconds, minutes, hours, days, weeks, months, years, etc. The processing of any number of data streams can be distributed across several processes. The processes can be run on any number of physical nodes (1 to N nodes) in a cluster. All the granularities of a data stream are not necessarily processed on one physical node and it can be less efficient if all granularities are processed on a single physical node. All the processes on a physical node are not necessarily for the same granularity. By distributing the granularities performed on a single node the resources of the analytics cluster 155 may be more evenly distributed amongst the nodes 157. As discussed, each physical node can process data from different data streams and all the processes on a physical node are not necessarily for the same data stream. In an embodiment the physical nodes in the analytics cluster 155 can be added or removed on-demand according to the detection of the computational resources being consumed. The maximum number of processes in physical nodes can be a function of the total size of the memory footprint of a single process and the amount of memory in each physical node.

With reference to FIG. 4, the data streams are indicated by the "client_.name_" and the processing of the data streams by the different physical nodes can be illustrated by the arrow extending between the different physical nodes 167, 169, 171. As illustrated the "client1.name1" and "client 2.name1" streams are processed by physical node 1, 167 at a minutes granularity, physical node 2, 169 in an hours granularity and processed by other physical nodes at higher time granularities. In contrast, the client2.name2 stream is processed by physical node N 171 at a minutes granularity and then processed by physical node 1, 167. The processing of the data streams for each physical node can be stored in a corresponding database shards.

The output features of the analytics cluster 155 can be output to a database cluster 160 for persistence of the features. These features are immediately made available for retrieval by users of the inventive system. The database cluster 160 can be organized into separate storage sections which can be called "shards" in some database embodiments. The shards 161, 163, 165 can reside on separate physical nodes 167, 169, 171 in the database cluster 160. The inventive system can be configured so that the physical nodes 167, 169, 171 in the analytics cluster 155 can be mapped to individual shards 161, 163, 165 in the database cluster 160. Furthermore in an embodiment, the system can be configured to have both the analytics cluster 155 and database cluster 160 share the same physical nodes 167, 169, 171. This makes it possible to optimize the writing of output features from the analytics processes to the most local shards 161 for that data stream in the database cluster 160. The database shards 161, 163, 165 can store data from the processing of the data streams in the physical nodes 167, 169, 171. Thus, in this example, the database shard1 161 includes data stored for c1.n1.minutes, c2.n1.minutes and c2.n2.hours shown in the analytics cluster 155 portion of physical node 1, 167. Similarly, the database shard 2, 163 includes data stored for c1.n1.hours and c2.n1.hours shown in the analytics cluster 155 portion of physical node 2, 169. And database shard N, 165 includes data stored for c2.n2.minutes from the analytics cluster 155 portion of physical node N, 171. In an embodiment, the user can read the data across some or all time granularities. For example, a user can read the c2.n2 data for all time granularities across multiple database nodes 167, 169, 171 and shards 161, 163, 165.

It has been found that having the output written to a shards 161, 163, 165 of the database cluster 160 physically co-located on the same hardware nodes 167, 169, 171 which is running the analytics process improves write throughput. Since the later retrieval of the output values is likely to happen by data stream, this configuration has the advantage of data locality during the read. In order to achieve this the hash function that generates a key which is used to route the samples to nodes 167, 169, 171 and processes in the analytics cluster 160 matches the shard key of the database which is used to route query requests to the appropriate shard 161, 163, 165 in the distributed database that the inventive system uses in its implementation.

Figure 5:
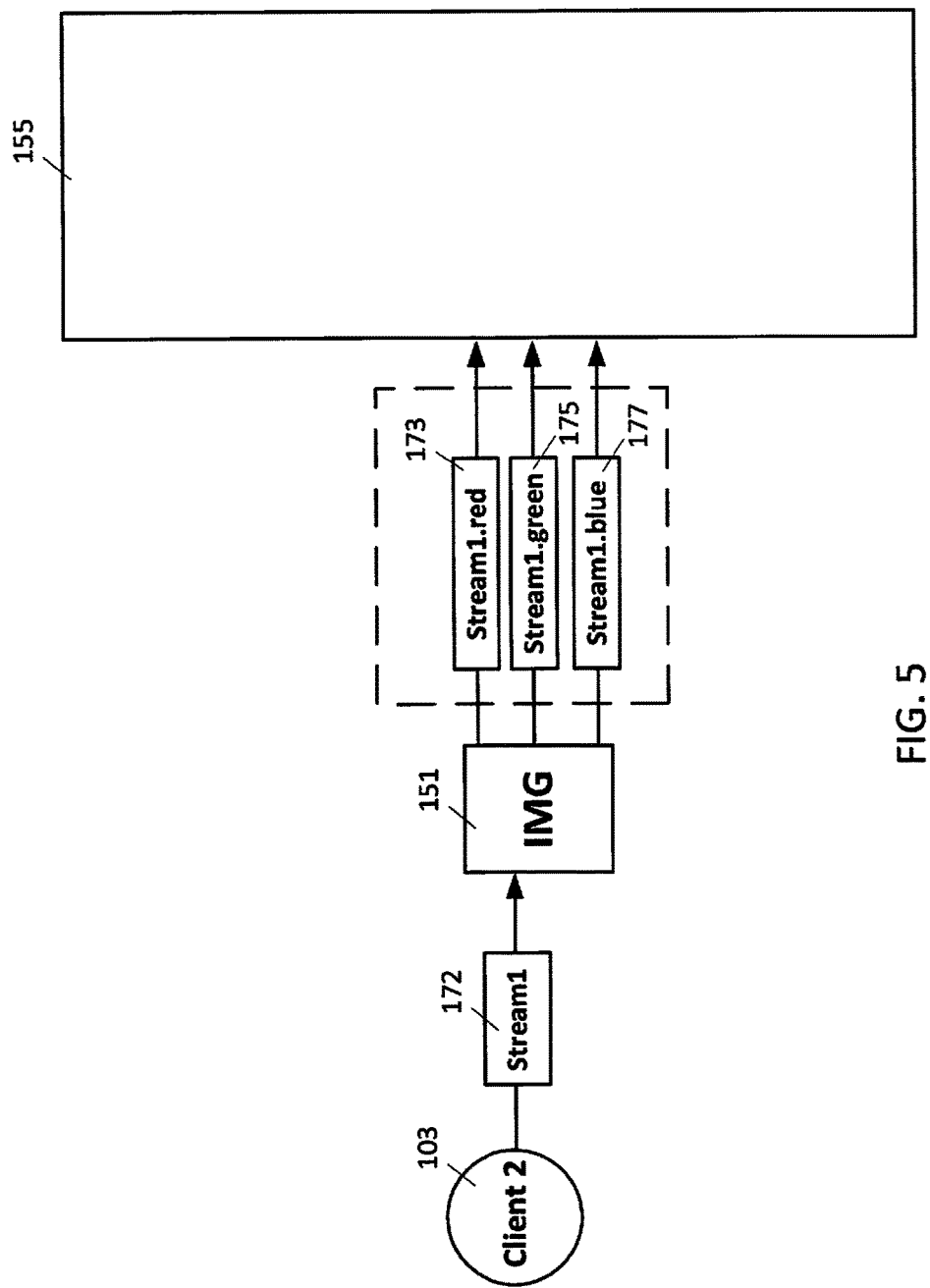
FIG. 5 illustrates an embodiment of sub-stream data processing by the inventive system.

In an embodiment with reference to FIG. 5, the IMG 151 can perform a normalization function which is a way to map non-numeric values of an incoming data stream 172 to be numeric. As an example, consider a data stream 172 name "Stream1" from a client 103. Instead of the numerical values that the inventive system may need, this stream 172 sends strings such as "red", "green" or "blue" in each sample. In this example, the IMG 151 normalization function can create three substreams 173, 175, 177 from this parent stream 177 and link them to the parent stream 172 for later querying. Each substream 173, 175, 177 could have the form of a name such as "Stream1.red" 173, "Stream1.green" 175 and "Stream1.blue" 177 where on each sample, the sample's value are either "0" or "1". If the value "red" appeared in the "Stream1"172 sample of the event, the "Stream1.red" 173 sample generated would be 1, otherwise it would be 0. The same logic is applied to the other substreams 175, 177 for the other possible string values that Stream1 172 can take on. The IMG 151 can allow the details of the normalization to be configured by the user. The normalized data from the substreams 173, 175, 177 can then be forwarded to the analytics cluster 155 and processed as described above. In an embodiment, a stream 1 can include sample data stream 1, 172 with non-numeric field (red, green, blue) shown below.

{"ts": "1390418389002", "pixel12345": "red"}}
{"ts": "1390418389003", "pixel12345": "red"}}
{"ts": "1390418389004", "pixel12345": "green"}}
{"ts": "1390418389005", "pixel12345": "blue"}}
{"ts": "1390418389006", "pixel12345": "red"}}

After passing through IMG normalization function 151 where the field "pixel12345" has been configured to normalize an enumeration values "red", "green" and "blue" to 0 and 1. The 3 output streams, stream1.red 173, stream1.green 175, stream1.blue 177 are shown below. The stream1.red output stream 173 includes values 1 for is =1390418389002, 1390418389003 and 1390418389006 corresponding to the text red in stream 1. The stream1.green output stream 175 includes the value 1 for 1390418389004 and the stream1.blue output stream 177 includes the value 1 for 1390418389005 which correspond to the green and blue text in the stream 1, 172 input samples. All other values in the stream1.red 173, stream1.green 175, stream1.blue 177 output streams are 0.

{"ts": "1390418389002", "pixel12345.red": 1}}
{"ts": "1390418389003", "pixel12345.red": 1}}
{"ts": "1390418389004", "pixel12345.red": 0}}
{"ts": "1390418389005", "pixel12345.red": 0}}
{"ts": "1390418389006", "pixel12345.red": 1}}
{"ts": "1390418389002", "pixel12345.green": 0}}
{"ts": "1390418389003", "pixel12345.green": 0}}
{"ts": "1390418389004", "pixel12345.green": 1}}
{"ts": "1390418389005", "pixel12345.green": 0}}
{"ts": "1390418389006", "pixel12345.green": 0}}
{"ts": "1390418389002", "pixel12345.blue": 0}}
{"ts": "1390418389003", "pixel12345.blue": 0}}
{"ts": "1390418389004", "pixel12345.blue": 0}}
{"ts": "1390418389005", "pixel12345.blue": 1}}
{"ts": "1390418389006", "pixel12345.blue": 0}}

In addition to the features being stored for each individual sample, there can be samples taken as roll-ups for time periods of various levels of time granularity, such as: hourly, daily, weekly, monthly, etc. This configuration allows trends and anomalies to be detected by the inventive system and reported to users if the trends and anomalies manifest themselves at any of these levels. The same algorithm for detecting and reporting features on a per-sample basis can be reused at a higher granularity such as weekly or monthly by simply treating the output of a previous granularity as the input sample to the next granularity. The output sample can be configured to either be: the current average of y(t) in that granularity or the latest y(t) value seen by the granularity.

Figure 6:
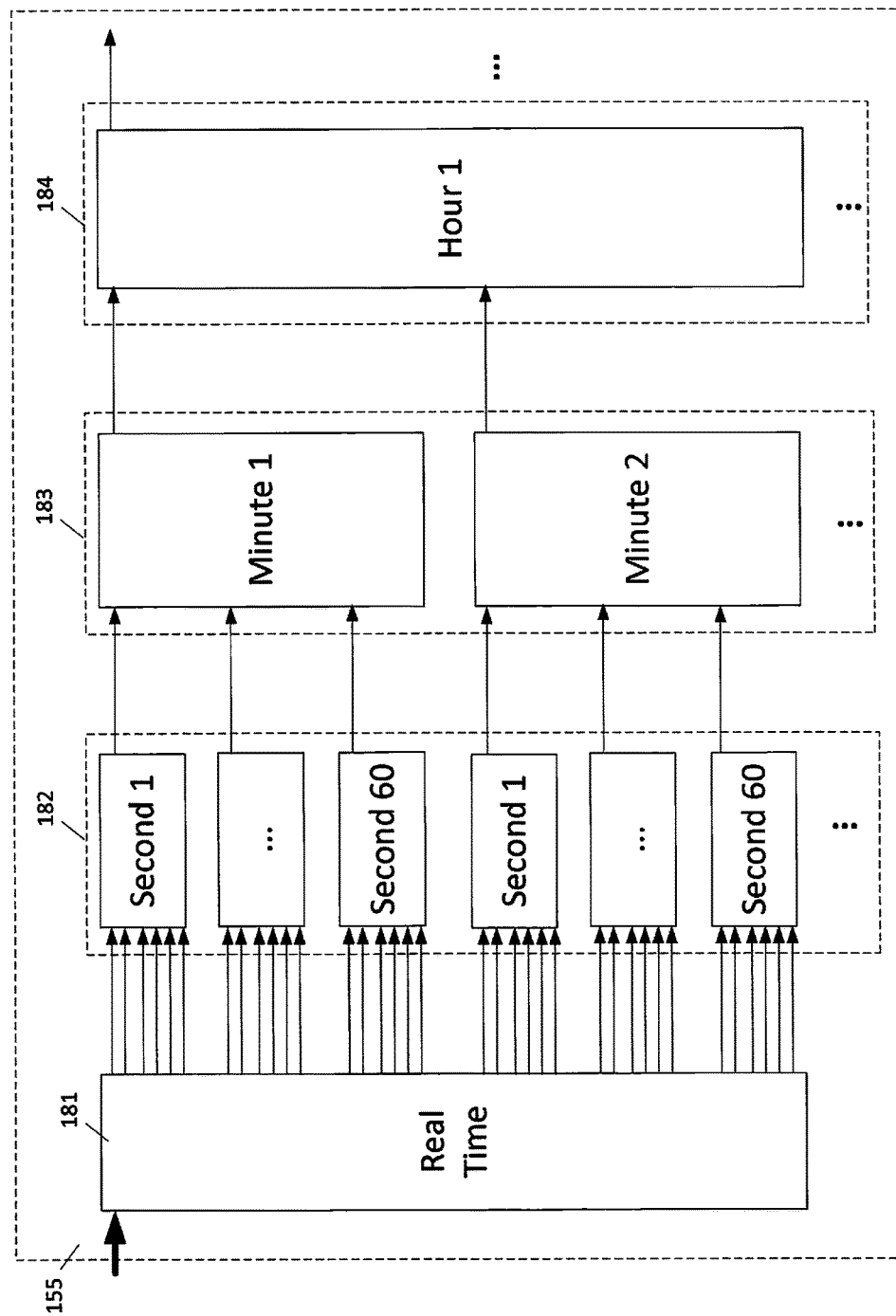
FIG. 6 illustrates a diagram of an embodiment of the Hierarchical Allocation of Analytics Processes Proportional to their Granularity Values.

FIG. 6 illustrates an embodiment of a hierarchical allocation of analytics processes that can be inversely proportional to their granularity values. In the analytics cluster 151, the output of real time processes 181 for granularity N are fed as samples into the processes 182 for granularity N+1. The higher the granularity, the less analytic processes may be allocated to handle that higher granularity. In an embodiment, the real-time (RT) samples are received by the analytics cluster 155 from the IMG 151 component and sent to a set of process nodes 182 in the analytics cluster 155 handing the second-granularity which can be seconds (S). Similarly, the output samples from the second-granularity process nodes 182 can be sent as input samples to the minute-granularity (M) processes distributed across the next process nodes 183. These second-granularity process nodes 182 or later processes can be on different physical nodes in the analytics cluster 155.

Each time granularity N absorbs samples from the smaller granularity N−1. If N receives a sample and the timestamp is for a new time slot at the granularity of N, then N emits a sample to N+1. For example, once a minute the hour process absorbs minute based samples from the minutes process. If the timestamp of a minute sample is more than an hour away from the last sample emitted, then the hour process emits a new sample containing the rolled up stats for that hour. This processing logic can be the same for every granularity utilized by the inventive system. Anomalies can be an exception to this process. In an embodiment, anomalies can be reported as soon as they are detected.

The inventive system can improve processing, write and read efficiencies. The policy of ensuring the computation of analytics belonging to different time granularities for the same data stream can occur on different physical nodes in the analytics cluster 155 to parallelize the computation efficiently. This is important since the generation of an output sample from the process computing at a shorter time granularity for a data stream may cause a domino effect of output samples being generated in the processes for longer time granularities. Since it is unlikely that multiple arbitrarily chosen data streams will be posting events to the inventive system at the exact same instance consistently over time. So allowing multiple data stream processes to coexist on the same physical hardware is unlikely to cause CPU contention.

The inventive system can automatically be initialized by launching a number of processes distributed across the physical nodes of the analytics cluster. The amount of processes dedicated to each granularity can be automatically scaled by the value of the granularity since the analytics cluster will be absorbing sample data at a frequency inversely proportional to the granularity value. For example, a large number of second-granularity processes need to be allocated, but a small number of year-granularity processes need to be allocated by the analytics cluster. The allocated processes can be evenly distributed between each of the physical nodes.

In an embodiment, each of the processes in the analytics cluster can be running the exact same algorithm. However, each of the processes may have been initialized with a value identifying their time granularity. The analytics cluster can be configured with the number of processes dedicated to the various time granularities in such a way that is proportional to the granularity value. For example, there only needs to be 1/60th the number of hour-granularity processes allocated as compared to the number of minute-granularity processes. Thus, there can be 360 second granularity processes and 60 minute granularity processes for each single hour granularity processes. This allocation policy can be automated.

Figure 7:
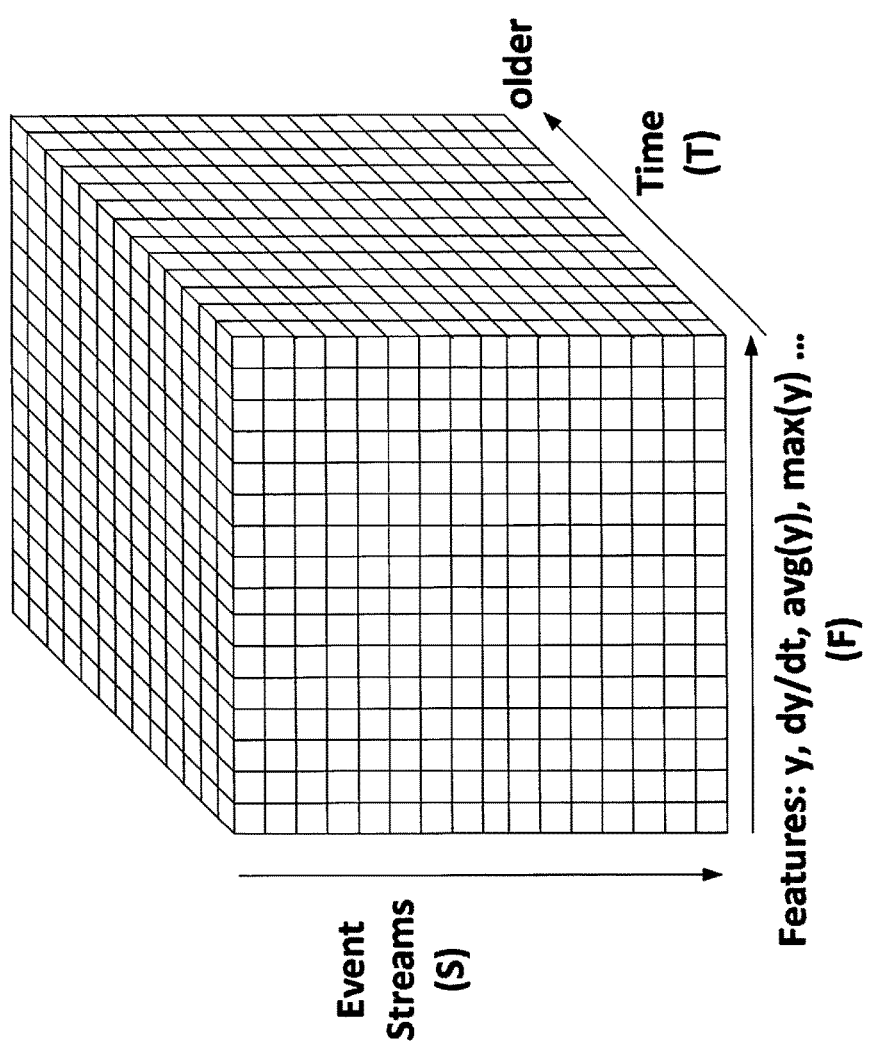
FIG. 7 illustrates an embodiment of data "features" generated by the Analytics Cluster visualized as a three dimensional structure with dimensions of: data streams, time and number of output features recorded per data stream.

With reference to FIG. 7, a diagram illustrates an embodiment of a memory storage structure of the feature data being collected by the inventive system. The data "features" generated by the Analytics Cluster can be visualized as a 3 dimensional structure with dimensions of: data streams, time and number of output features recorded per data stream. In this example, the data collected is S×F×T where S is the number of event streams being sampled, F is the number of derived features and T is the number of samples collected for each stream. The data is illustrated with each event streams S listed vertically, the features F described above would be populated horizontally in the columns. Each item along the third T-axis (into the page) contains the same information as the table of the first S and F dimensions, but for previous time samples going back in time. Dividing T by the number of samples per unit time yields a figure for the amount of data generated per unit time. The T dimension allows for a segregation of data to be dispatched to batched processing tasks in the background such as jobs distributed to a cluster of nodes.

The system can analyze this S×F×T data structure by looking at data in various planes of the three dimensional data structure. For example, a horizontal F×T plane of the data structure can represent all data for all time for a single event stream. Similarly, data in a vertical S×F plane of the data structure can represent all stream data for all events for a particular time slot which can be any recorded granularity: second, minute, hour, day, week, year, etc. A vertical plane of data in the F×T plane can represent all data for a feature for all event streams and all time. A single line of data for a single event stream S and a single feature F can provide all data for the feature of the event stream for all of the recorded times.

It some embodiments, the system can detect data anomaly during the processing of the current sample. In an embodiment, an anomaly can be any sample data that surpasses the mean by an amount A times the standard deviation where A is a configurable value per data stream. The system can generate a message signaling the anomaly and a flag indicating whether or not an anomaly was detected can be stored with the event stream stored in the data structure.

The inventive system can use various algorithms in the processes of the analytics cluster that stores the samples, calculates their output features, and performs anomaly detection. The system's analytics cluster receives and processes the data samples. The system then persists the data samples into the database along with the newly calculated features relevant to the new sample.

The processes in the analytics cluster can be executing a function F, which is responsible for deriving the output features to be persisted for each of the samples "e" 191, 193. The average of $e_N$ across all time, N samples total can be represented by the equation: $Avg(e_N)=[e_N+e_{N-1}e_{N-2}+\ldots+e_1]/N$. However this equation requires all N samples to be retained in memory because each new sample requires all previous samples 195 to be included in the recalculation. This equation can be represented by FIG. 8 where the new sample 191 is represented by the black square which is adjacent to all previous samples 193. This equation can be rewritten with an incremental average across all time, N samples total: $Avg(e_N)=Avg(e_N)+((e_{N-1})+((e_N-avg(e_{N-1}))/N)$ and illustrated in FIG. 9. In this equation, only the current sample 191 and the last average $avg(e_{N-1})$ are used, all previous samples 193 can be forgotten to solve $Avg(e_N)$. This method may not be useful if a windowed average is needed because this equation "remembers" all the samples 193.

To be an efficient streaming algorithm, F may only have access to the new sample 191 and an in-memory set of parameters labeled "S" that encode the state of the previous W samples 197 previously received in the data stream. The value "W" can be an adjustable window size. The previous W samples 197 may not be utilized explicitly or stored in the memory of the analytics cluster. This equation requires the W samples 197 to be retained. Instead, the formulas for calculating the windowed mean and standard deviation can utilize a decay such that any contribution from samples 193 older than the W samples 197 are negligible. However, any samples 193 older than the W samples 197 can be forgotten. However, this can still too expensive for large W samples 197.

$$WAvg(e_N)=(e_N+e_{N-1}+e_{N-2}+\ldots+e_{N-W-1})/W$$

This equation can be rewritten with an incremental decayed windowed average:

$$WAvg(e_N)=(alpha*WAvg(e_{N-1}))[[(beta*e_N)-(alpha*WAvg(e_{N-1}))]/W]$$

With reference to FIG. 11, this equation only requires the new sample 191 and the previous average 199 as part of the calculation. AR the previous samples 193 can be forgotten. The previous average 199 represents a windowed averaged across the window of size W. The "decay" coefficients (alpha and beta) ensure any contribution to the average by samples older than W are tiny. The coefficients are tuned to be a function of W. In an example embodiment, the values for W, alpha and beta and be: W=30, alpha=1−(1/W)=0.967 and beta=alpha*2=1.934. The example W, alpha and beta values would result in a revised equation:

$$WAvg(e_N)=(alpha*WAvg(e_{N-1}))+[[(1.934*e_N)-(0.967*WAvg(e_{N-1}))]/30]$$

In other embodiments, these values can be any other suitable W, alpha and beta values. As discussed, the size of W can be made to be configurable per data stream and it can be possible to tune W in a way that is cognisant of the time granularity. For example, w=approximately 10 may be an optimum value for minute granularities and W=approximately 45 might be an optimum value for day granularities.

In an embodiment, the decayed windowed incremental mean and standard deviation calculations can improve the efficiency of the inventive system. In order to reduce the amount of RAM needed for the analytics processing of each data stream, the algorithm used in the analytics cluster to calculate the incremental, windowed mean and standard deviation, is performing these functions without calculating over an explicit window of samples in memory. Instead, only the current sample and the previous value can be fed into a variation of the incremental formulas that decay the contribution of older samples to the mean and standard deviation values. The decay coefficients are a function of the window size (W) tuned so that any sample beyond W samples old is contributing negligibly to the incremental, windowed mean and standard deviation values. This reduces the amount of samples needed to be kept in memory in order to calculate mean and standard deviation values over a window of size W, by a factor of W. However this process still allows the calculation over the same window size to match what a traditional windowed formula would yield. The use of this memory saving optimization can be important since the real-time processing occurs in the RAM of a distributed analytics cluster. This allows W to be any value without increasing the memory used. The memory used becomes a linear function of only the number of simultaneous data streams being handled by the inventive system. Furthermore, W can be tuned to each data stream dynamically in order to maximize the accuracy of the anomaly detection algorithm.

In an embodiment, the data output through the data streams 153 can be recorded to a database. Table 3 illustrates an example of data outputs for two time periods t=3:14 PM and t=3:15 PM. In this example, the features recorded can include s(t), S.yLast, SyAvgLast, SyVarLast, S.yPrimeAveLast, S.min, S.max, S.tslast, S.tslastemitted, S.n and Anomaly. These features will be described in more detail later.

TABLE 3

| Feature | Value | Value |
|---|---|---|
| t | 3:14 PM | 3:15 PM |
| s(t) | 16.3 | 16 |
| S.yLast | 16.7 | 16.3 |
| S.yAvgLast | 17.125 | 17.05 |
| S.yVarLast | 0.012 | 0.011 |
| S.yPrimeAvgLast | 0.01 | 0.01 |
| S.min | 16.7 | 16.3 |
| S.max | 18.7 | 18.7 |
| S.tslast | 3:13 | 3:14 |
| S.tslastemitted | 3:00 | 3:00 |
| S.n | 432 | 433 |
| Anomaly? | N | N |

The function F can also update that state to $S_{new}$ to reflect the newly absorbed sample. This means: (data to insert, $S_{new}$)=F(e, S)

The function F may need to solve the following values for the specified features:

y—the sample itself, stored as y in S as $y_{Last}$ dy/dt—a discrete first derivative which is simply (y−S.$y_{Last}$/Δt) where Δt is the difference in timestamps between the current sample and S.$y_{Last}$'s. The values S.$y_{Last}$ and the timestamp of S.$y_{Last}$ are fetched from S. Alternatively, Δt might be a fixed interval for this particular event stream.

avg(y)—the windowed, decayed average of y calculated incrementally:

avg(y)=((α*S.yAvgLast)+(((β*y)−(α*S.yAvgLast))/min(W,S.n)))

var(y)—the windowed, decayed variance and standard deviation of y calculated incrementally:

var(y)=((α*S.yVarLast)+(β*(y−S.yAvgLast)*(y−avg(y))))stddev=sqrt(abs(var(y)/min(W,S.n)))

avg(dy/dt)—the windowed, decayed average of dy/dt calculated incrementally. This is identical to the calculation of avg(y) but with dy/dt replacing y, and S.yPrimeAvgLast replacing S.yAvgLast in the formula.

diff—a byproduct of the dy/dt calculation above, equivalent to y−S.$y_{Last}$ min—the smallest numerical value that has appeared in this stream:

S.min=min(y, S.min); return S.min max—the largest numerical value that has appeared in this stream:

S.max=max(y, S.max); return S.max

The following state variables in S can be updated after all the above calculations have been made:

update the last avg(y):
S.yAvgLast=avg(y)
update the last variance calculation:
S.yVarLast=var(y)
update running tally of the # of samples:
S.n=S.n+1
update the last sample and timestamp:
S.yLast=y
S.tslast=ts So the values stored in S for each stream in memory during runtime execution in the analytics cluster processes can be:

n—the total number of samples seen so far in this stream
$y_{Last}$—the last sample seen
yAvgLast—the last average calculated for y
yVarLast—the last variance calculated for y
yPrimeAvgLast—the last average calculated for dy/dt
min—smallest value seen in the stream so far
max—largest value seen in the stream so far
tslast—timestamp of the last sample
tslastemitted—the timestamp of the last time a sample was emitted from this process (see below)

After the process makes the above calculations for the incoming sample, the process can decide whether to emit a sample to the next higher granularity process for this data stream. In an embodiment, the process can emit a sample value if the amount of time that has passed since the last time a sample was emitted for this data stream (tslastemitted) is greater than the time granularity of the process. For example, if the time granularity of the process is an hour, and the current timestamp is 62 minutes which is greater than tslastemitted, then a new sample is emitted and the tslastemitted is updated to the current timestamp.

Note that the last feature shown above in Table 3 is "Anomaly?" In both of these time data samples, there were no anomalies. However, if anomalous data is detected, the recorded data that was anomalous would be indicated. For example, any anomalies detected by the system can be persisted to the database by annotating the samples which trigger the anomaly detection. Messages can also be generated and transmitted by the system to the user to alert them of any detected anomalies in any of their data streams as soon as they happen.

If an anomaly is detected during the processing of the current sample, then a message signaling the anomaly can be generated and emitted to components listening for the anomalies. In an embodiment, an anomaly can be considered any sample that surpasses the mean by an amount A times the standard deviation where A is a configurable value per data stream. An emitted sample, along with the new features/state variables S and a flag indicating whether or not an anomaly was detected in processing it, are all recorded in the system database with the data stream's streamID.

The state S can be reconstructed from a reboot by looking only at the last sample's features stored in the database. Optimizations can be done to trade-off space for recovery time and feature calculation math by not storing the min/max/diffs and averages for each sample. Since the entire state of each data stream is contained by S, migrating the computation of a data stream to a new process on a different physical node in the analytics cluster is inexpensive. This might be done to balance the computational resources in the cluster or on the database node being written to.

The present disclosure, in various embodiments, includes components, methods, processes, systems and/or apparatus substantially as depicted and described herein, including various embodiments, subcombinations, and subsets thereof. Those of skill in the art will understand how to make and use the present disclosure after understanding the present disclosure. The present disclosure, in various embodiments, includes providing devices and processes in the absence of items not depicted and/or described herein or in various embodiments hereof, including in the absence of such items as may have been used in previous devices or processes, e.g., for improving performance, achieving ease and/or reducing cost of implementation. Rather, as the following claims reflect, inventive aspects lie in less than all features of any single foregoing disclosed embodiment.

What is claimed is:

1. A method for processing data comprising:
providing an inbound message gateway (IMG) and an analytics cluster having plurality of physical nodes;
receiving event data by the IMG, the event data comprising an incoming data stream having a data stream name, the incoming data stream name comprising a time series sequence of non-numerical values;
performing a normalization function on the event data that creates a plurality of substreams by the IMG, wherein the normalization function converts the non-numerical values into numeric values and each of the plurality of substreams has a substream name that is linked to the incoming data stream;
transmitting the plurality of substreams in parallel paths from the IMG to the analytics cluster; and
processing the first data stream by a first plurality of physical nodes in the analytics cluster wherein each of the plurality of physical nodes has a plurality of recorded time granularities;
wherein output samples from the first plurality of physical nodes having a first recorded time granularity are input samples for a second plurality of physical nodes having a second recorded time granularity and output samples from second plurality of physical nodes are input samples for a third plurality of physical nodes having a third recorded time granularity wherein the first recorded time granularity is smaller than the second recorded time granularity and the second recorded time granularity is smaller than the third recorded time granularity and wherein the first data stream is sequentially processed by the first plurality of physical nodes, the second plurality of physical nodes and the third plurality of physical nodes.

2. The method of claim 1 further comprising:
transmitting a second data stream and a third data stream from the IMG to the analytics cluster; and
processing the second data stream and the third data stream by the plurality of physical nodes in the analytics cluster.

3. The method of claim 1 wherein the analytics cluster includes an algorithm which calculates incremental, windowed mean and standard deviation for the first data stream.

4. The method of claim 3 wherein the algorithm includes decay coefficients that are a function of the size of the window.

5. The method of claim 3 wherein real-time processing occurs in random access memory (RAM) of a distributed analytics cluster.

* * * * *